United States Patent [19]
Gard et al.

[11] Patent Number: 4,837,518
[45] Date of Patent: Jun. 6, 1989

[54] METHOD AND APPARATUS FOR MEASURING THE ELECTRICAL RESISTIVITY OF GEOLOGIC FORMATIONS THROUGH METAL DRILL PIPE OR CASING

[75] Inventors: Michael F. Gard, Plano; John E. E. Kingman, Dallas; James D. Klein, McKinney, all of Tex.

[73] Assignee: Atlantic Richfield Company, Los Angeles, Calif.

[21] Appl. No.: 86,999

[22] Filed: Aug. 18, 1987

[51] Int. Cl.⁴ .............................................. G01V 3/18
[52] U.S. Cl. .................................................. 324/368
[58] Field of Search ............... 324/368, 366, 357, 354, 324/348, 370, 371, 372, 62, 64, 65 P, 65 R, 65 CR

[56] References Cited

U.S. PATENT DOCUMENTS

| | | | |
|---|---|---|---|
| 2,371,658 | 3/1945 | Stewart | 324/368 |
| 2,400,593 | 5/1946 | Neufeld | 324/368 |
| 2,587,518 | 2/1952 | Paarson | 324/368 |
| 2,891,215 | 6/1959 | Fearon | |
| 3,424,981 | 1/1969 | Erdman | |
| 3,459,196 | 1/1949 | Stewart | 324/368 |
| 3,488,574 | 1/1970 | Tanguy | |
| 3,568,053 | 3/1971 | Kilpatrick | 324/368 X |
| 4,178,544 | 12/1979 | Hoffman | 324/64 |
| 4,264,860 | 4/1981 | Thebault | 324/62 |
| 4,446,424 | 5/1984 | Chatanier et al. | 324/62 |
| 4,628,256 | 12/1986 | Powell | 324/95 |
| 4,686,477 | 8/1987 | Givens et al. | 324/366 |

Primary Examiner—Reinhard J. Eisenzopf
Assistant Examiner—Warren S. Edmonds
Attorney, Agent, or Firm—Michael E. Martin

[57] ABSTRACT

The resistivity of a geologic formation is measure through drillpipe or casing by applying a low frequency bipolar voltage to the casing and to a ground electrode and traversing the casing with a tool having contractors which are connected to a differential amplifier to detect a differential voltage within the casing caused by current leaving the casing into the formation. The differential amplifier is connected to a unity gain inverter and a switching arrangement for alternately reversing the polarity of the connection of input voltages to the differential amplifier. A switching network alternately connects the outputs of the differential amplifier and the output of the inverter to the input of a low pass filter, and a clock is provided for driving the network in synchronization. The casing and formation resistivities may be measured by applying a voltage along a predetermined length of casing between two contractors which are spaced apart farther and on opposite sides of the differential amplifier pickup contactors. The voltage applied across the formation may be applied to the casing at the earth's surface or downhole adjacent the points of measurement of casing resistivity and formation resistivity.

22 Claims, 4 Drawing Sheets

METHOD AND APPARATUS FOR MEASURING THE ELECTRICAL RESISTIVITY OF GEOLOGIC FORMATIONS THROUGH METAL DRILL PIPE OR CASING

BACKGROUND OF THE INVENTION

1. Field of the Invention

The present invention pertains to a method and apparatus for measuring the electrical resistivity of a subterranean formation through a metal well casing or drillstem utilizing an amplifier circuit which is capable of accurately measuring relatively small electrical voltages.

2. Background

Various techniques have been contemplated for measuring the resistivity of a geologic formation as a means of determining formation physical properties, locating hydrocarbon reserves and related operations. One problem associated with making electrical signal measurements for determining formation resistivity or conductivity pertains to the presence of metal well casing or metal drill pipe, both of which interfere with determining the value of resistance or conductivity of the formation itself.

Some prior art efforts to measure geologic formation resistivity by measuring the current flow through a metal well casing or drillstem have assumed that the resistance of the casing or metal drill pipe is constant. Further work in this general area has revealed that not only the dimensional differences in metal well casing due to manufacturing tolerances, corrosion and other environmental factors affect the resistance of the casing but also the chemical composition of the metal itself causes significant variations in resistivity of casing or drill pipe.

Other problems associated with prior art efforts to measure the resistivity of a geologic formation pertain to the signal level which can be sensed by measuring instrumentation at shallow as well as deep depths of measurement in a wellbore, and also the electrical interference created by certain components of the measurement system, including circuit elements, conductors and connectors. Accordingly, there has been a longfelt need to develop improved formation resistivity measurement techniques and apparatus in order to make this basic process viable not only for exploration operations concerning hydrocarbons and mineral values, but also to carry out improved operations known generally in the art as "well logging."

The present invention overcomes some of the deficiencies of prior art techniques and apparatus and provides a superior method and system for making geologic formation resistivity measurements through metal casing and/or metal drill pipe, for example.

SUMMARY OF THE INVENTION

The present invention provides an improved method for measuring the electrical resistivity or conductivity of a geologic formation, which method is carried out through a metal cased wellbore or a metal drill pipe, for example. In accordance with one aspect of the present invention, a method for measuring formation resistivity is carried out by making differential voltage measurements along a casing wall to determine the place or places where electrical current is leaving the casing and flowing through portions of the geologic formation. The method of the present invention contemplates the use of an improved amplifier circuit which is inserted into a cased wellbore and is adapted to detect differential voltages along the casing wall to determine those points wherein a significant differential voltage change indicates that current is leaving the casing and flowing through the formation.

The method of the present invention also contemplates the use of relatively low frequency AC current or switched DC current in a range which will avoid adverse electrical effects caused by the casing or drillpipe and formation interface and including such effects as induced polarization phenomena. Moreover, the signal frequency is also selected in a range which will avoid errors due to movement of the measurement device through the casing and so-called "skin" effects along the casing wall which are noticeable with relatively high frequency current. For conventional steel drill pipe and well casing the skin effect begins to manifest itself at signal frequencies greater than about 10 Hz.

In accordance with another important aspect of the present invention, a formation resistivity method has been developed wherein a source of electric current is connected to a first electrode which may comprise a well casing, or a drill pipe inserted in an uncased wellbore, and a second well casing or ground electrode which is disposed a selected distance from the first electrode which may, in some cases, be in the range of at least three to five times the depth of the casing or electrode at which the resistivity measurements are being taken so as to avoid any distortions in the voltages and current flows resulting from locations of the electrode.

In accordance with yet another aspect of the present invention, an improved method for measuring geologic formation resistivity is provided wherein the resistivity of a metal casing or drill pipe is measurable with an improved apparatus and method so that the effect of the casing or drill pipe resistivity can be accounted for in the overall measurement process.

The present invention still further provides an improved system for measuring formation resistivity which includes an amplifier circuit particularly adapted for coupling differential voltages detected in a well casing to the input of a differential amplifier. The amplifier circuit includes a unity gain inverter connected to the output of the differential amplifier and to the input of a switching device adapted to alternately connect one of its inputs to a single output which is in turn connected to averaging means such as a low pass filter. A clock circuit drives means for coupling the detected voltages of the differential amplifier inputs and a switching device in synchronization. The improved amplifier circuit is included as part of a system for supplying a low frequency bipolar current to the casing to measure both casing resistance and formation resistance. The low frequency bipolar current source is preferably a switched DC source which minimizes error signals from the system. In one embodiment of the system, the amplifier circuit is coupled to a converter circuit and a central processing unit, all disposed in a tool which may be lowered into the wellbore.

Those skilled in the art will recognize the above described features and advantages of the present invention together with other superior aspects thereof upon reading the detailed description which follows in conjunction with the drawing.

DESCRIPTION OF PREFERRED EMBODIMENTS

Figure 1:
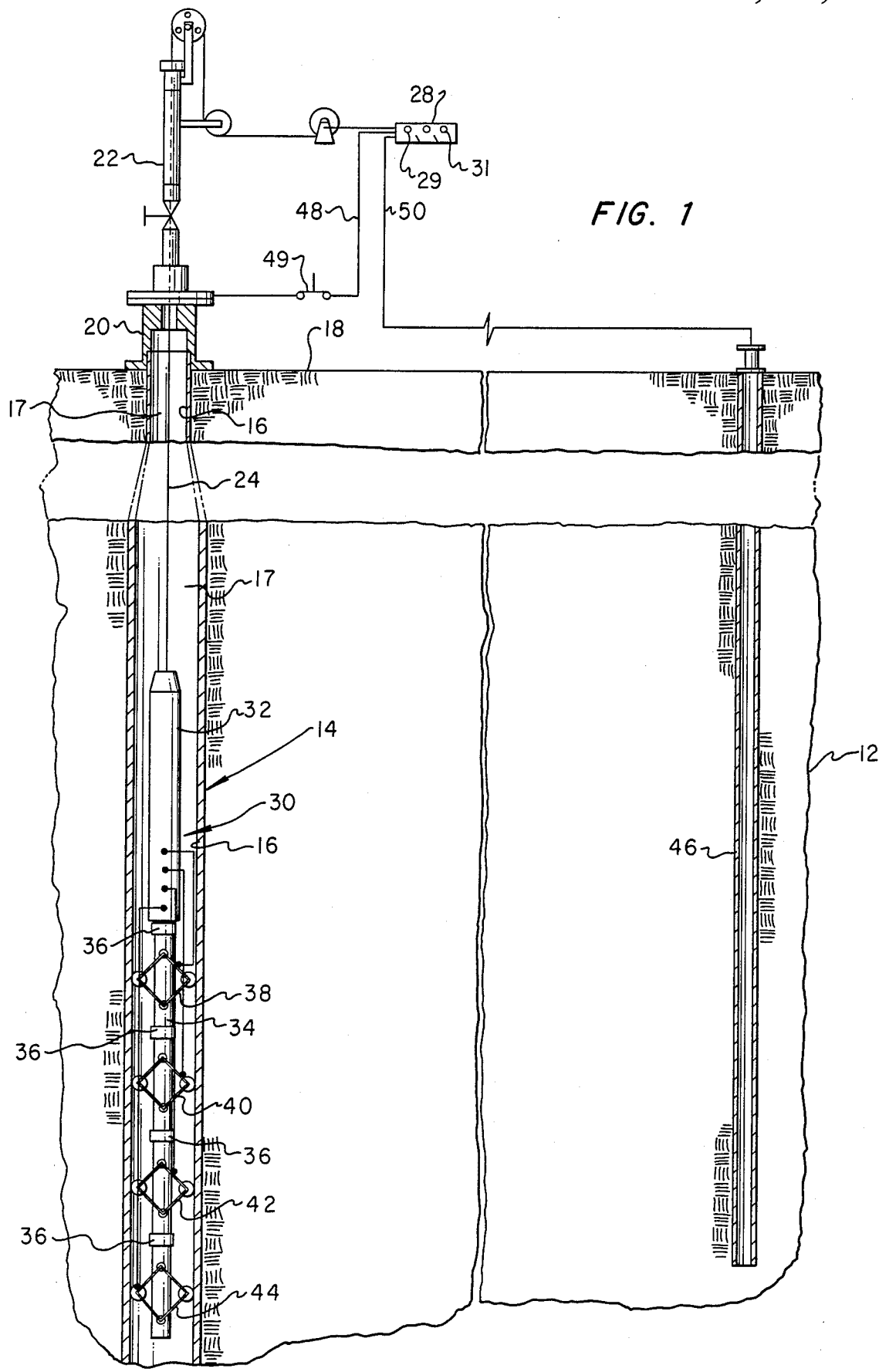
FIG. 1 is a vertical section view in somewhat schematic form showing an apparatus according to the present invention for measuring formation resistivity.

In the description which follows, like parts are marked throughout the specification and drawing with the same reference numerals, respectively. The drawing figures are in schematic form and conventional components are illustrated by standard symbols where applicable.

Referring to FIG. 1, there is illustrated in somewhat schematic form a preferred system for measuring the resistivity of a subterranean earth formation 12. Typically, in accordance with the system of the invention, formation resistivity is measured through a cased wellbore 14 having a generally cylindrical elongated metal casing 16 set in place in accordance with conventional practice in the drilling and completion of wells for producing oil and gas. The casing 16 may extend for several thousand feet into the earth from the surface 18 at which a wellhead 20 of conventional construction is provided and is in conductive engagement with the casing 16. A conventional wireline lubricator device 22 is mounted on the wellhead 20 for insertion and withdrawal of tools and instrument containers into the interior 17 of the wellbore and connected to an elongated cable 24. The cable 24 may be of a type known as a "wireline" and which includes several electrical conductors protected by an outer sheath for transmitting signals and electrical power between a surface unit 28 and a downhole system 30. The system 30, which will be described in further detail herein, is characterized by a housing 32 which includes certain electrical circuitry and operating components and which is connected at one end to the cable 24 and, at its opposite end, to a contactor support stem 34. The support stem 34 extends from the housing 32 and includes spaced apart electrically insulating coupling portions 36 which are interposed between electrical contactor assemblies 38, 40, 42 and 44. Accordingly, each of the contactors 38, 40, 42 and 44 are electrically insulated from each other but are in conductive engagement with the inner wall of the casing 16. Suitable electrical leads extend from the housing 30 to each of the contactors 38, 40, 42, and 44, as indicated in FIG. 1.

The electrical resistivity of the formation 12 is measured in accordance with the present invention by imposing a relatively low frequency AC or switched DC electrical signal on the formation 12 through the casing 16. The potential is preferrably imposed on the formation between the casing 16 and a ground electrode which may be a relatively short rod or the like at the surface or a second well casing 46 spaced from the casing 16 a distance in the range of up to about 3 to 5 times the depth of the point at which formation resistivity measurements are being taken. In other words, if resistivity measurements are being taken in a range of from 1000 to 2000 feet depth from the surface 18, the location of the electrode 46 may be as much as from 3,000 feet to 10,000 feet from the casing 16. If the electrode is in contact with the earth at a point near the surface the distance of the electrode from the casing 16 should be near the maximum of the range specified. If the electrode is a casing or similar conductor extending a depth similar to the casing 16 the distance can be less than the minimum of the range.

The low frequency voltage signal imposed on the formation through the casing 16 and the electrode 46 may be obtained by connecting a source, not shown, disposed in or connected to the unit 28 to a conductor 48 connected to the casing 16 through the wellhead structure 20 and a ground electrode conductor 50 leading from the surface unit 28 to the electrode 46. The unit 28 preferably includes suitable means 29 and 31 for, respectively, reading the current flow to the casing 16 and voltage potential difference between casing 16 and the electrode 46. Alternatively, the electrical potential source may be connected to one of the contactor assemblies through the cable 24 or disposed in the downhole system 30 and connected to one of the contactors 38 or 44. In such an instance, a switch 49 is opened to remove the conductor 48 from electrically conductive relationship with the casing 16. A modified arrangement is illustrated in FIG. 3.

Figure 2:
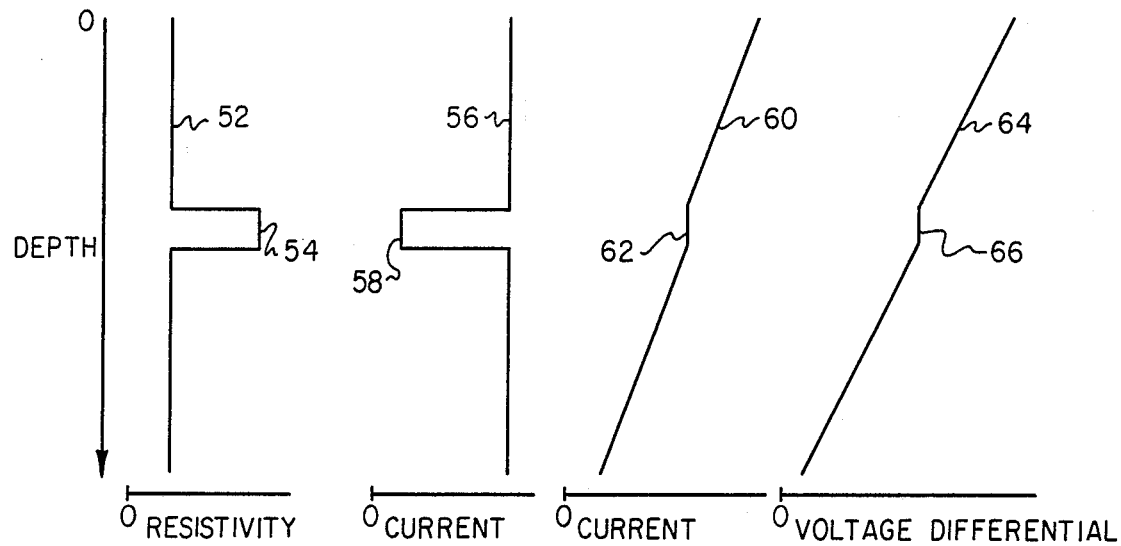
FIG. 2 is a diagram indicating the characteristics of various parameters measured utilizing the method and system of the present invention.

Referring briefly to FIG. 2, there are illustrated diagrams of the parameters which may be measured utilizing the system 30 for determining a change in resistivity of an earth formation which might indicate the location of hydrocarbons, and the presence of other fluids such as might be desirable during stimulation or enhanced oil recovery processes. In FIG. 2, the ordinate for each of the curves is the depth of the measurement from the surface 18 and the abscissa is a scale beginning at zero for each of the parameters measured. The line 52 indicates the earth's resistivity in ohm-m, for example. The earth's resistivity may exhibit a generalized constant value except in the presence of fluids such as hydrocarbons which are more resistive than certain other substances. Accordingly, discontinuity 54 indicates an increase in resistivity. If it is assumed that current flow out of the casing occurs at a substantially constant rate regardless of depth, the curve 56, indicating current, is valid having a discontinuity at 58 indicating the point of increased earth's resistivity. The curve 60 indicates the actual current measured along the casing with increasing depth, from the point of application of the current, assuming uniform flow of current out of the casing into the formation 12. The discontinuity 62 in the curve 60 indicates the point of increased resistivity. The curve 64 is a plot of incremental voltage differences measured along the casing as a function of depth. Ideally, the slope of the curve 64 is constant except for the discontinuity 66 wherein the increased resistivity of the formation causes the rate of voltage drop to decrease.

A source of error in measuring formation resistivity is that due to changes in the resistivity of the casing or a drill pipe, for example, in which the system 30 is disposed. Since the total resistivity measured with the arrangement illustrated in FIG. 1 includes the resistivity of the casing itself, this quantity must be dealt with in calculating or determining the resistivity of the formation. As pointed out in co-pending U.S. patent application Ser. No. 889,572, filed July 24, 1986, in the name of Michael F. Gard and assigned to the assignee of the present invention, actual dimensions of casing of a given nominal size vary along its length and there is also a substantial variation in electrical resistance per foot of length due to the differences in chemical composition of the steel or other metal which comprises the casing. Moreover, as corrosion occurs in the casing, the wall thickness is reduced and resistance increases. Accordingly, it is also necessary to measure casing resistance in order to accurately interpret the formation resistivity. Moreover, unwanted or irrelevant voltage signals which can occur in prior art logging systems, for example, easily exceed the measured signals. Accordingly, the system and technique of the present invention overcomes both of the prior art problems with electrical logging methods to provide an improved and unique formation resistivity measuring system.

Figure 3:
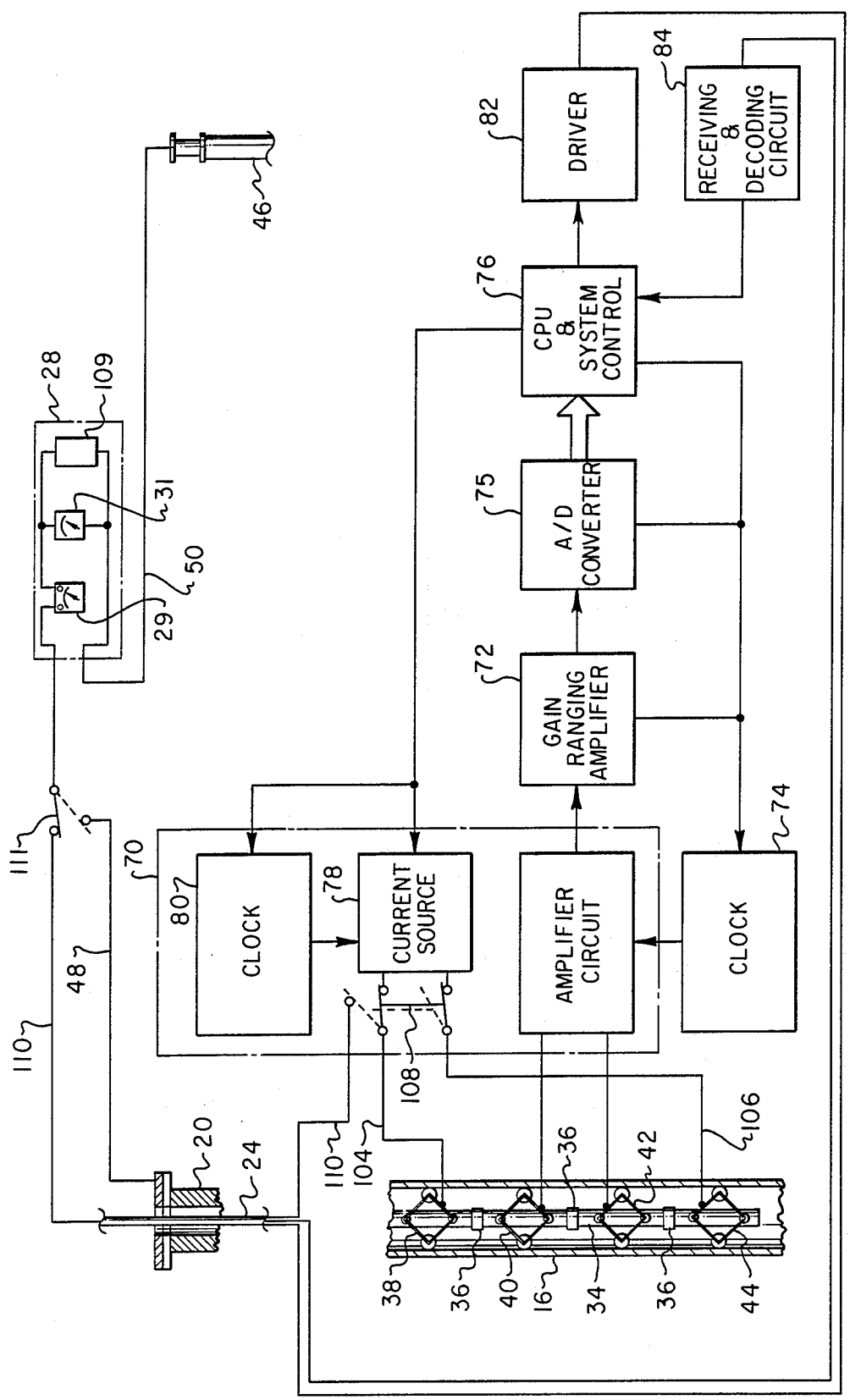
FIG. 3 is a block diagram showing the major components of the system of the present invention.

Referring now to FIG. 3, there is illustrated a somewhat generalized block diagram of the components which may be included in the housing 32 for operating the system 30. An amplifier circuit 70, including a preamplifier to be described in further detail herein, is operably connected to the contactors 40 and 42. The amplifier circuit 70 is connected to a gain ranging amplifier 72 and to a clock 74. The output from the gain ranging amplifier 72 is transmitted to an A/D converter 75 to a suitable central data processing and system control unit or CPU 76. The system control unit 76 drives the clock 74 and also suitably controls a bipolar current source 78 of known magnitude for imposing a potential across the contactors 38 and 44 whereby the resistivity of the casing 14 may be calculated from the voltage measured by the amplifier circuit 70 through the contactors 40 and 42 and the known amplitude of the current source 78. The current source 78 is suitably controlled by a clock circuit 80, as will be described in further detail herein, and the current flow from the current source 78 is a predetermined quantity which can be set by the control unit 76. Output signals from the control unit 76 are suitably treated by a driver circuit 82 connected to the cable 24. Input signals to the system control unit and the resistivity measuring circuit described herein are brought downhole through the cable 24 to a receiving and decoding circuit 84.

Figure 4:
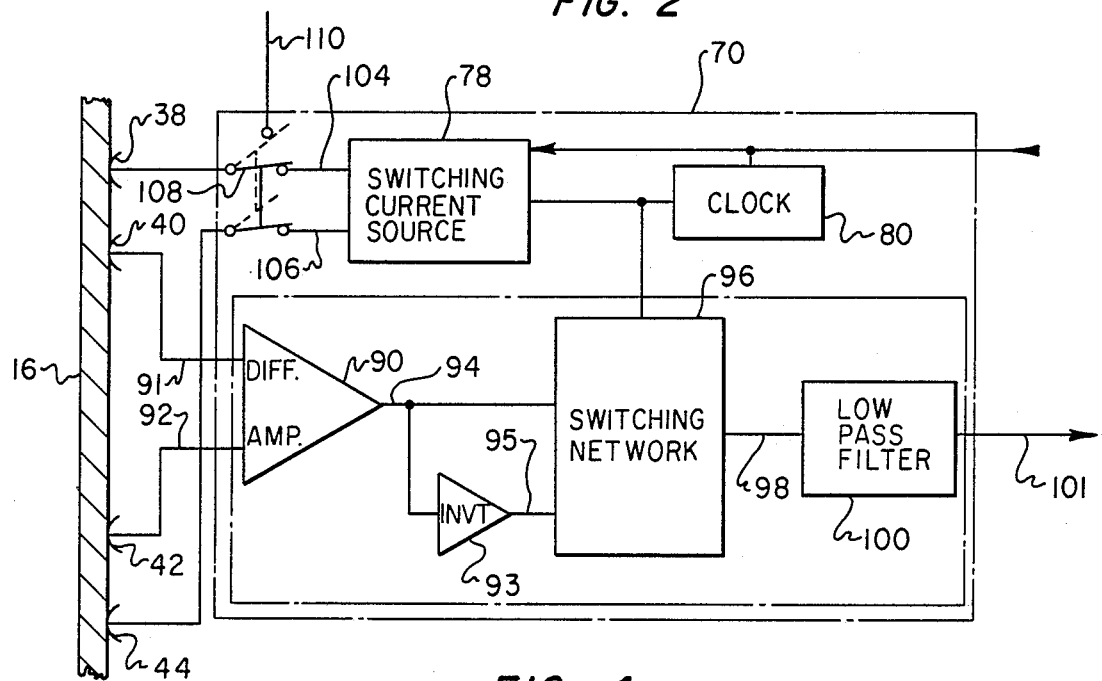
FIG. 4 is a schematic diagram showing details of the amplifier circuit.

Referring now to FIG. 4, there is illustrated a schematic diagram of the amplifier circuit 70 which is shown to include the current source 78 and the clock 80 shown in FIG. 3. The circuit 70 includes a differential amplifier 90 which is disposed to have its input terminals 92 and 92 connected to the casing contactors 40 and 42, as illustrated. Accordingly, voltages detected by the contactors 40 and 42 are applied to the differential amplifier 90 at alternate polarities to reduce the effects of spurious signals and offset voltages of the differential amplifier. An inverting amplifier 93 has its input terminal connected to the output terminal 94 of the amplifier 90. The amplifier 93 is preferably configured to have a gain of minus one to its output terminal 95, that is, the signal appearing on conductor 95 has nominally the same amplitude but opposite polarity of the signal appearing on the output terminal 94. A switching network 96 is provided and has two inputs connected to the terminals 94 and 95 and an output conductor 98 is connected to a filter 100.

The output signal from the filter 100 may be connected to the gain ranging amplifier 72 or directly to the A/D converter 75 by way of the conductor 101 depending on the filter signal output level. The clock 80 is operably connected to the current source 78 and the switching network 96 so that these elements are caused to switch between their alternate conditions at precisely the same time. Commercial sources for certain ones of the devices are Analog Devices, Inc., part #AD624SD for the differential amplifier 90, Burr Brown Corporation, part #OPA105WM for the inverter 93, Harris Corporation, part #HI5051-2 for the switching network 96, and a Butterwork design two-pole type with a cutoff frequency of one tenth the frequency of the clock 80 is useful for the lowpass filter 100. As illustrated in FIGS. 3 and 4, the current source 78 is operably connected to the contactors 38 and 44 through respective conductors 104 and 106. A switch 108 is interposed in the conductor 104 for alternately connecting the contactor 38 to a source of current 109, FIG. 3, of a suitable frequency and voltage potential which may be detected by the amplifier circuit 70 during formation resistivity measurements. The current sources for determining formation resistivity may be conducted downhole through the cable 24, including a conductor 110 to the switch 108 and the contactor 38 whereby measurements of any differential voltage detected along the casing 16, as the contactors 40 and 42 move therealong, can be detected to verify any noteworthy changes in the amount of current leaving the casing and flowing into the formation. The source 109 may be selectively connected to the casing 16 through the conductors 48 or 110 by way of a switch 111, as shown in FIG. 3.

In a preferred embodiment of the circuit 70, the amplifier 90 is configured to have a gain of one thousand. For purposes of illustration, it may be assumed that the switching current source 78 has been instructed by the control unit 76 to cause positive current to flow from contactor 38 to contactor 44. In this first condition of the current source 78, the differential voltage detected between contactors 40 and 42 is such that contactor 40 is positive with respect to contactor 42. Therefore, the signal appearing on the output terminal 94 is the sum of two terms. The first term of the sum is the differential voltage detected between contactors 40 and 42 multiplied by the gain. The second term of the sum is the composite offset inherent in the amplifier circuit 90. Due to the high gain required to amplify voltages in the range of 1 to 10 microvolts, detected between contactors 40 and 42, the offset voltage of the differential amplifier 90 is typically eighty to one hundred times greater than the desired signal term representing differential voltage detected between contactors 40 and 42 multiplied by the gain.

It may also be noted that, with the current source 78 remaining in the same polarity of current flow, the signal appearing at terminal 94 is applied to the input of inverting amplifier 93, which has an output signal which is the sum of three terms. The first term of the sum is the differential voltage detected between contactors 40 and 42 multiplied by the gain of differential amplifier 90 multiplied by the gain of inverting amplifier 93 (which is minus one). The second term of the sum is the composite offset of differential amplifier 90 multiplied by the gain of inverting amplifier 93. The third term of the sum is the composite offset inherent in inverting amplifier 93. Because inverting amplifier 93 has a gain of minus one, which is low, a realizable amplifier 93 may be employed which has a composite offset term which is negligible compared to the other terms appearing at the output terminal 95.

Thus, in the first condition of the current source 78, there are two signals applied to the input of the switching network 96. One input is the signal on conductor 94, which is the differential voltage between contactors 40 and 42 multiplied by the gain of amplifier 90 plus the composite offset of amplifier 90. The other input is the signal on conductor 95, which is minus one multiplied by the differential voltage between contactors 40 and 42 multiplied by the gain of amplifier 90, plus minus one multiplied by the composite offset of amplifier 90, plus the composite offset of inverting amplifier 93.

If now the control unit 76 commands the current source 78 to reverse polarity of the current flow, then the differential voltage detected between contactors 40 and 42 is the same in amplitude but opposite in polarity compared to the first condition of the current source 78. However, the composite offset voltages of differential amplifier 90 and inverting amplifier 93 retain the same polarities as in the first condition of the current source 78, because they are independent of input signal. Therefore, in the second condition of the current source 78, the two signals applied to the inputs of switching network 96 are altered in some terms. The signal on conductor 94 is now the differential voltage between contactors 40 and 42 (which is now reversed in polarity compared to the first condition of current source 78) pluse the composite offset of amplifier 90. In like manner, the signal on conductor 95 is now minus one multiplied by the differential voltage between contactors 40 and 42 (which is itself reversed in polarity compared to the first condition of current source 78), plus minus one multiplied by the composite offset of amplifier 90, plus the composite offset of amplifier 93.

The switching network 96 is now caused to be cooperatively coupled to the switching current source 78 so that in the first condition of the current source 78, the output 98 of the switching network 96 is identical to the signal on conductor 94, namely the differential voltage between contactors 40 and 42 multiplied by the gain of amplifier 90, plus the composite offset of amplifier 90. In the second condition of the current source 78, the output 98 of the switching network 96 is identical to the signal on conductor 95, namely minus one multiplied by the differential voltage between contactors 40 and 42 (which is the same as minus one times the differential voltage between contactors 40 and 42 in the first condition), plus minus one times the composite offset of amplifier 90, plus the composite offset of amplifier 93.

Thus, a simple average of the output 98 of the switching network 96 represents the differential voltage between contactors 40 and 42 (using the first condition of current source 78 as reference), plus one-half the composite offset of inverting amplifier 93. The composite offset of amplifier 90 has been eliminated. As related above, the composite offset of amplifier 93 can be made negligible. One way to obtain this average is by use of means such as a lowpass filter 100. Other averaging means may be utilized, for example a summing amplifier and sample-hold elements.

In the embodiment of the circuit shown, the clock 80 operates at a fifty (50%) percent duty cycle so that the signal appearing on conductor 98 appears as a square wave. The main alternating portion of the square wave is made up of the offset voltage of the amplifier 90. In a preferred embodiment, the clock 80 is operated at a frequency at least ten times greater than the cutoff frequency of the low pass filter 100 so that the lowpass filter effectively removes the alternating portion of the signal. Different relationships between clock frequency and filter cutoff frequency may be employed, if desired. As a result, the output signal appearing on the conductor 101 comprises the amplified input voltage detected by the contactors 40 and 42 plus one-half the offset voltage generated by the inverter circuit 93. Since this offset voltage is negligibly small relative to the amplified input signal, the output signal on conductor 101 is a very accurate amplified representation of the desired signal.

Figure 5:
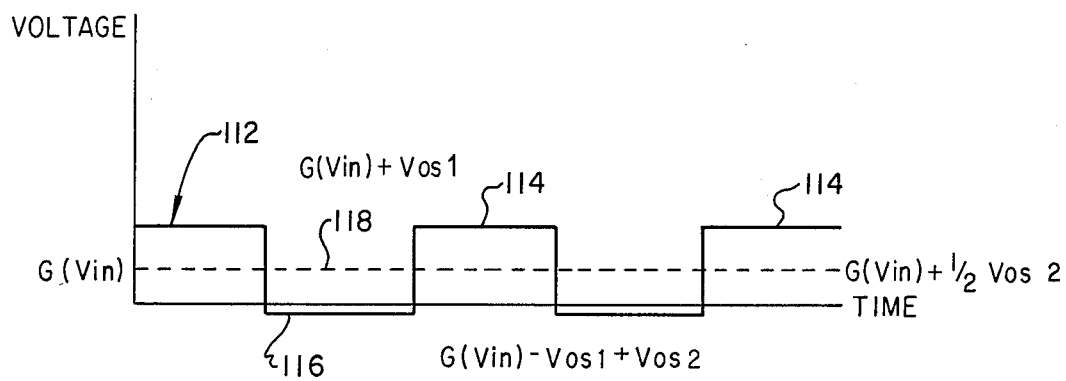
FIG. 5 is a a diagram showing the characteristics of voltage and current imposed on the casing and the formation using the method and system of the present invention.

The signal relationships are illustrated in some detail with reference to FIG. 5. In Fgure 5, there is provided a voltage versus time representation of the signals appearing on conductors 98 and 101. The square wave pattern 112 is the waveform appearing on conductor 98. The higher voltage portion of this wave pattern indicated by numeral 114 has a value of the input voltage ($V_{in}$) times the gain (G) of the amplifier circuit 90, plus the offset voltage of differential amplifier 90 ($V_{os1}$). $V_{os1}$ is indicated as positive for purposes of illustration although it is well known that such offset voltages may be either positive or negative. In similar fashion, the lower level portion 116 of the waveform 112 has a value equal to $G(V_{in}) - V_{os1}$ plus the offset voltage of inverter circuit 93 ($V_{os2}$). The dotted line waveform 118 represents the average values of the portions 114 and 116 of the waveform 112. As indicated, this average value is equal to $G(V_{in})$ plus $\frac{1}{2}(V_{os2})$. This average value is generated by the filter 100 and appears on the output conductor 101. As noted above, that portion of the voltage on conductor 101 represented by $\frac{1}{2}(V_{os2})$ can be ignored so that the output on conductor 101 is essentially equal to $G(V_{in})$.

When the switch 108 is in the position to couple the known current source 78 to the casing 16, the output at conductor 101 represents the resistance in the casing. By switching the current source 78 to reverse the polarity of the signals at the inputs of the amplifier 90 in synchronization with the switching network 96 and passing the signal on conductor 98 through the filter 100 to the conductor 101, the offset voltages of the amplifier circuit 90 are filtered from the signal appearing on the conductor 101. The frequency of the clock 80 is preferably such as to produce a switched DC signal having a frequency of below about 10 Hz. By the same token, the current source imposed on the conductors 48 and 50 would also be in the same frequency range and would preferably be a switched DC type signal ranging from 1.0 amp to 10.0 amps and 200 microvolts to 1000 microvolts sensed across the contactors 40 and 42. The current source must be operated synchronously with the switching network 96 as commanded by the receiving and decoding circuit 84 in cooperation with the CPU and system control unit 76.

It is contemplated that the measurements for determining casing resistivity and formation resistivity may be carried out more or less continuously as the system 30 is traversed through the casing 16. The system control unit 76 is preferably configured to alternately determine casing resistance by first imposing the known current source 78 on the contactors 38 and 44 and computing casing resistance based on reading the voltage differential between the contactors 40 and 42 and the current provided from source 78. Then the current source from conductor 110 is imposed on the contactor 38 and measured, and the voltage differential at the contactors 40 and 42 is read to determine where the formation resistivity changes are incurred. By conducting the source of formation current downhole to the contactor 38, the signal level may be maintained at a higher value than if the formation resistivity measuring current is applied at the wellhead through the conductor 48. Of course, the casing resistivity could be determined during one traversal of the system 30 through the wellbore followed by measurement of the formation resistivity during a second traversal. However, by alternately switching from determining casing resistivity to determining formation resistivity, the exact location of that point at which a measurable differential of current leaving the casing 16 into the formation is obtained. By applying the current source to the contactor 38, the lower level signal which is obtained at great depths with a source of current applied to the casing at the surface is avoided. Electronic noise in the circuits becomes less significant as a result of the higher level signals due to the current being applied close to the measurement device.

Figure 6:
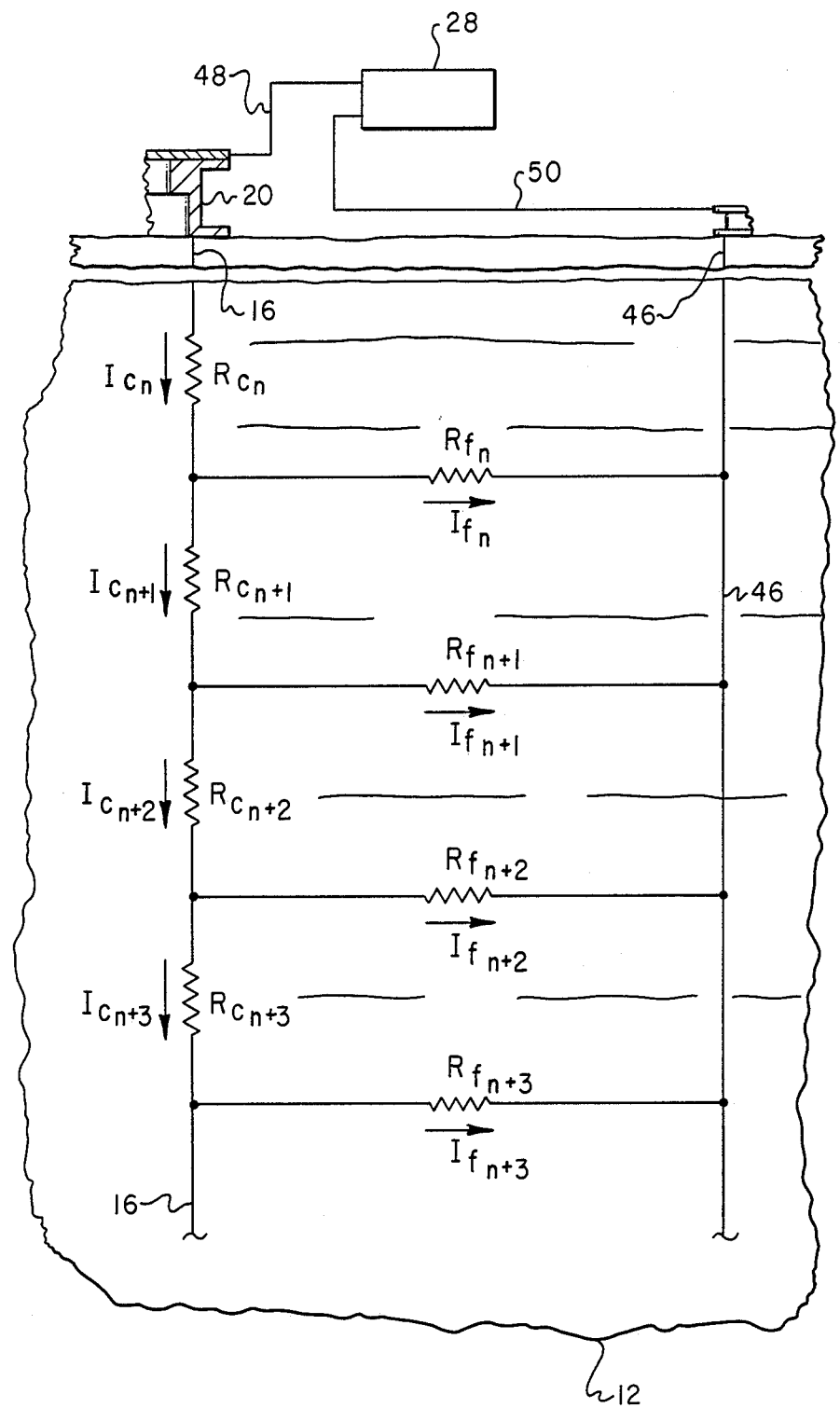
FIG. 6 is a diagram showing a simplified resistive model of the casing and formation.

Referring to FIG. 6, a simplified resistive model of the casing 16 and the formation 12 is illustrated. For each interval of measurement of differential voltages along the casing 16, the current ($I_{c_n}$) flowing along the casing for the interval n may be determined based on the measurement of differential voltage and the previous determination of casing resistance $R_{c_n}$. The determination of current flow at intervals along the casing of $n+1$, $n+2$ and so on may be determined from direct measurement and the current flowing into the formation at each interval is the difference between the current flowing through the casing at the previous interval and the current flowing through the casing at the next interval.

For example, the current ($I_{f_n}$) flowing through the formation at the interval n, can be determined from the equation:

$$I_{f_n} = I_{c_n} - I_{c_{n+1}}$$

Accordingly, the current flowing into the formation at each interval is the difference between the current flowing through the casing at the previous interval and the current flowing through the casing at the next interval. Since the potential applied between the casing 16 and the electrode 46 is known and the current flowing through the formation may be determined, the resistivity of the formation at a particular interval may be calculated.

The method and system of the present invention may also be utilized to determine formation resistivity or perform "logging" through a drill pipe drilling in an uncased wellbore wherein the resistance due to a conductive fluid in the wellbore between the drill pipe outer surface and the wall of the wellbore may be considered uniform. Accordingly, the resistivity of the drill pipe can be determined directly in the same manner that the resistivity of the casing is measured, a resistivity factor for the fluid between the drill pipe and the wellbore can be applied and the overall formation resistivity can then be determined from the known quantities of drillpipe resistivity and the resistivity of the fluid in the annulus between the drill pipe and the formation.

Although preferred embodiments of a system and method in accordance with the present invention have been described herein in detail, those skilled in the art will recognize that various substitutions and modifications may be made to the specific embodiments disclosed without departing from the scope and spirit of the invention as recited in the appended claims.

What we claim is:

1. A method for measuring selected electrical properties of a subterranean formation into which at least one wellbore has been drilled and is provided with a tubular metal conduit extending within said wellbore, said method comprising the steps of:

providing means insertable in said wellbore including a first set of spaced apart contact means for contacting said conduit, a current source connectable to said first set of contact means, a second set of spaced apart contact means for contacting said conduit between said first set of contact means, and means for measuring a voltage between said second set of contact means, providing a source of electrical potential between said conduit and an electrode connected to said formation;

determining the resistivity of at least selected portions of said conduit by applying current from said current source to said first set of contact means and measuring the flow of current and the voltage differential across a selected portion of said conduit between said second set of contact means;

applying an electrical potential through said formation between said electrode and said conduit; and measuring the voltage differential between one of said sets of contact means at a selected portion of said conduit, and determining the current flowing along said conduit based on the resistivity of said selected portion of said conduit to determine the current flow through said formation at a selected point on said conduit.

2. The method set forth in claim 1 including the step of:

traversing said sets of contact means along said conduit and determining the resistivity of said conduit and the current flowing to said formation over a selected portion of said conduit.

3. The method set forth in claim 1 wherein:
   said source of electrical potential is connected to said conduit at a point near the earth's surface.

4. The method set forth in claim 1 wherein:
   said source of electrical potential is connected to said conduit at a selected point on said conduit below the earth's surface.

5. The method set forth in claim 4 wherein:
   said source of electrical potential is connected to said conduit through one of said contact means.

6. The method set forth in claim 1 wherein:
   said current source is a bipolar current source.

7. The method set forth in claim 6 wherein:
   said current source is a switched DC current source.

8. A method for determining electrical characteristics of an earth formation in which a wellbore has been formed and is provided with a tubular metal casing extending within said wellbore, said method comprising the steps of:

providing an electrical source for application to selected incremental portions of said casing;

providing an electrical source for application to said formation through said casing and an electrode spaced from said casing;

measuring current flow and voltage differential along selected incremental portions of said casing and determining the resistivity of said selected incremental portions of said casing, respectively;

applying said electrical source to said formation through said casing and measuring voltage differentials along said selected incremental portions of said casing;

determining current flow along respective ones of said selected incremental portions of said casing based on measured voltage differentials and resistivity of said incremental portions of said casing, respectively; and determining current flow through selected intervals of said formation by the difference between current flow through said casing at one incremental portion of said casing and another incremental portion of said casing.

9. The method set forth in claim 8 including the step of:

determining the resistivity of a selected interval of said formation by the current flow through said selected interval and the voltage potential applied to said formation through said casing and said electrode.

10. The method set forth in claim 8 wherein:
said electrical source is applied to said casing at a selected point in said casing below the earth's surface.

11. The method set forth in claim 8 wherein:
said electrical source is applied to said casing at a point near the earth's surface.

12. A system for determining the resistivity of an earth formation by measuring voltage differentials along a metal conduit penetrating said formation, said system comprising:

an electrical potential source having a first electrode, means for electrically connecting said first electrode to said conduit and a second electrode connected to said formation at a distance from said conduit;

a first set of spaced apart contactors for detecting voltages between first and second points in said conduit;

a differential amplifier having input conductors coupled to said first set of contactors, respectively, and having an output conductor;

an inverter circuit having an input conductor to said differential amplifier output conductor and having an inverter output conductor;

switching means having a first input conductor connected to said differential amplifier output conductor, a second input conductor connected to said inverter output conductor, a control input conductor and a switching means output conductor, said switching means being operable to alternately couple said first and second input conductors to said switching means output conductor; and signal averaging means having an input conductor connected to the said switching means output conductor and an averaging means output conductor for conducting a signal indicating the differential voltage along said conduit between said first set of contactors.

13. The system set forth in claim 12 including:
a second set of spaced apart contactors for conducting current through a portion of said conduit including said first and second points, and a current source for causing a current of known magnitude to flow through said conduit between said first and second points.

14. The system set forth in claim 13 including:
means for connecting said potential source to said conduit at a point in said formation.

15. The system set forth in claim 14 wherein:
said means for connecting said potential source to said conduit includes one of said contactors.

16. The system set forth in claim 12 including:
means for connecting said potential source to said conduit near the earth's surface.

17. The system set forth in claim 13 including:
clock means having an output conductor coupled to said current source and said switching means for causing said current source to alternate the polarity of current applied to said conduit in synchronization with the alternate coupling of said switching means first and second input conductors to said switching means output conductor.

18. The system set forth in claim 12 wherein:
said signal averaging means comprise a low pass filter.

19. A system for determining the resistivity of an earth formation into which a wellbore has been formed and is provided with an elongated conduit extending within said wellbore, said system comprising:

means for disposition in said wellbore for determining the electrical resistance of selected portions of said conduit including a first set of spaced apart contactors for engagement with said conduit, means connected to said first set of contactors comprising circuit means including a differential amplifier for measuring a voltage differential along said conduit between said first set of contactors, a second set of contactors disposed spaced apart such that said first set of contactors is between said contactors of said second set, a source of current for connection to said second set of contactors for causing a current flow of known magnitude through said conduit between said contactors of said first set;

an electrical potential source including means for connecting said potential source to said conduit and means for connecting said potential source to an electrode in electrically conductive contact with said formation at a point spaced from said wellbore; and means for measuring the voltage applied to said formation between said conduit and said electrode.

20. The system set forth in claim 19, including:
means for selectively connecting said potential source to said conduit at the earth's surface and at a point in said conduit below the earth's surface, respectively.

21. The system set forth in claim 19, wherein:
said differential amplifier includes input conductors coupled to said first set of contactors, respectively, and having an amplifier output conductor and said circuit means includes;

an inverter circuit having an input conductor connected to said amplifier output conductor and having an inverter output conductor;

switching means having a first input conductor connected to said amplifier output conductor, a second input conductor and a switching means output conductor, said switching means output conductor being alternately coupled to said first and second input conductors;

a filter having a filter input conductor connected to said switching means output conductor and a filter output conductor; and clock means having a clock output conductor coupled to said current source to alternate the polarity of current applied to said conduit in synchronization with the alternate coupling of said switching means first and second conductors to said switching means output conductor.

22. Apparatus for measuring voltage differentials along a metal conduit comprising:

a set of spaced apart contactors for contacting first and second points on said conduit;

a current source and means for connecting said current source to said contactors, respectively;

a differential amplifier having input conductors coupled to said contactors, respectively, and having an amplifier output conductor;

an inverter circuit having an input conductor connected to said amplifier output conductor and having an inverter output conductor;

switching means having a first input conductor connected to said amplifier output conductor, a second input conductor connected to said inverter output conductor, a control input conductor and a switching means output conductor, said switching means output conductor being alternately coupled to said first and second input conductors;

signal averaging means having an input conductor connected to said switching means output conductor and an averaging means output conductor; and clock means having an output conductor coupled to said current source and said switching means for causing said current source to alternate the polarity of current applied to said conduit in synchronization with the alternate coupling of said switching means first and second input conductors to said switching means output conductor to provide a signal on said switching means output conductor indicating the differential voltage along said conduit between said contactors.

* * * * *